United States Patent [19]
Giamati

[11] Patent Number: 5,767,605
[45] Date of Patent: Jun. 16, 1998

[54] BRUSH ASSEMBLY WITH WEAR INSERTS FOR A ROTATING ICE PROTECTION SYSTEM

[75] Inventor: Michael John Giamati, Akron, Ohio

[73] Assignee: The B.F. Goodrich Company, Richfield, Ohio

[21] Appl. No.: 690,099

[22] Filed: Jul. 31, 1996

[51] Int. Cl.⁶ ............................................... H01R 39/38
[52] U.S. Cl. .................. 310/239; 310/232; 310/242; 310/245; 310/248; 310/251
[58] Field of Search ............................ 310/232, 239, 310/242, 245, 247, 231, 248, 251

[56] References Cited

U.S. PATENT DOCUMENTS

| | | | |
|---|---|---|---|
| 3,745,393 | 7/1973 | Spors | 310/239 |
| 4,136,295 | 1/1979 | Sweet | 310/239 |
| 4,845,396 | 7/1989 | Huber | 310/239 |
| 5,114,351 | 5/1992 | Hoffmann | 439/13 |
| 5,343,106 | 8/1994 | Lungu et al. | 310/239 |
| 5,479,060 | 12/1995 | Giamati et al. | 310/232 |
| 5,509,625 | 4/1996 | Oullette et al. | 244/134 D |

*Primary Examiner*—Steven L. Stephan
*Assistant Examiner*—Timothy A. Williams
*Attorney, Agent, or Firm*—Richard A. Romanchik

[57] ABSTRACT

An improved brush assembly is provided for conducting electrical power from a fixed power system to a rotating ice protection system. The invention is especially adapted for use with an aircraft propeller ice protection system. According to an aspect of the invention, the brush assembly has a housing with a brush enclosure, the enclosure having slots provided therein for slidably receiving a plurality of brushes. A plurality of wear inserts are disposed in the slots adjacent the brushes in order to provide a wearing surface to prevent excessive wear of the brushes.

33 Claims, 6 Drawing Sheets

BRUSH ASSEMBLY WITH WEAR INSERTS FOR A ROTATING ICE PROTECTION SYSTEM

FIELD OF THE INVENTION

This invention relates to an improved brush assembly for conducting electrical power from a fixed power system to a rotating ice protection system. The invention is especially adapted for use with an aircraft propeller ice protection system.

BACKGROUND OF THE INVENTION

The hazards of aircraft flight in atmospheric icing conditions are well known. Through the years, various workers in the art have developed various techniques for removing or preventing ice accumulation encountered during flight. Certain techniques are particularly adapted to protect specific parts of an aircraft. An electrothermal propeller de-icing system is an example of a specialized system.

In an electrothermal propeller de-icing system, electrothermal de-icers are bonded to the inboard leading edge portions of the individual blades of an aircraft propeller. An example of an electrothermal propeller de-icer is presented in U.S. Pat. No. 4,386,749 issued Jun. 7, 1983 to Sweet et al. (the '749 patent). Electrical power is supplied to the individual de-icers through flexible wire harnesses that act as jumpers between each blade and the propeller bulkhead. The harnesses must be flexible since each blade must be able to rotate about its axis in order to effectuate pitch changes. An example of a wire harness is presented in U.S. Pat. No. 5,020,741, issued Jun. 4, 1991, to Ziegler et al. (the '741 patent).

Electrical power is conducted to the propeller ice protection system through a sliding contact comprising a slip ring assembly and a brush assembly. A typical arrangement is presented in U.S. Pat. No. 4,136,295, issued Jan. 23, 1979, to Sweet (the '295 patent). The slip ring assembly is mounted to the back of the propeller bulkhead facing the aircraft engine. According to a very common embodiment, the slip ring assembly includes a metal dish having an annular channel that receives a plurality of conductive slip rings formed from a copper alloy. The rings are potted into the channel with an epoxy compound which also provides the necessary dielectric insulation between the individual rings and the channel. The wire harnesses are electrically connected to the individual rings. In such manner, electrical power is transferred from the slip rings to the individual de-icers.

Electrical power is transferred to the slip rings through a brush assembly. A particular system may have one or more brush assemblies. Each assembly typically includes a housing or enclosure that slidably receives two or more electrical brushes. The brushes are normally composed of a carbon based matrix. Carbon brushes and various carbon based brush compounds are well known in the brush and commutation art. A spring biases each brush against a slip ring. Some form of electrical power connection is attached to the housing. The power connection connects the brush assembly to the aircraft power system and may take the form of a shell-type connector or a number of individual studs. Flexible shunts transfer power from the power connection to each brush. The aircraft power system typically includes a timing and switching device that switches power from brush to brush which thereby switches power to the various de-icers in a predetermined timed sequence.

There are various forms of brush assemblies adapted for use with a propeller ice protection system. An example of a commonly used brush assembly is provided in the '295 patent. This assembly is modular and comprises a series of brush modules that are stacked to provide the necessary number of brushes. An assembly formed as a single unit that predates the modular assembly is also described in the '295 patent. Other assemblies formed as a single unit are known in the art. Such assemblies may also incorporate multiple brushes per slip ring. For example, six brushes could be used in a three slip ring system with two brush riding on each ring. Using multiple brushes per slip ring may be advantageous if current levels are too high to use a single brush per ring.

In these kinds of brush assemblies, the frictional force between the brush and rotating slip ring interface causes the brushes to be forced against one side of the brush slot or aperture. Since the brush is typically made from a soft carbon or graphite matrix and the brush housing is made from an abrasive composite matrix, the side loading and relative motion between the brush and housing results in chafing or "hooking" to the side of the brush. Carbon deposits from this chafing mixes with oils and other fluids and creates a sludge which interferes with brush movement and causes the brushes to stick in the brush housing, thereby resulting in arcing and performance degradation. In addition, the brush housing aperture wears away resulting in a required replacement of the housing. As the slot wears away and widens, the brushes "cock" in the slot at an unfavorable angle resulting in electrical performance loss.

As is apparent from the previous discussion, an improved brush assembly is desired. In particular, a brush assembly having reduced brush and brush housing wear is desired.

SUMMARY OF THE INVENTION

According to one aspect of the present invention, a brush assembly is provided for conducting electrical power from a fixed power system to a rotating ice protection system through a slip ring assembly having a slip ring comprising:

an electrically conductive brush for conducting electrical power to the slip ring;

a housing having a brush enclosure with an aperture for slidably receiving said brush in alignment with the slip ring, wherein at least a portion of the surface of said aperture in contact with said brush is non-abrasive for minimizing the wear rate of said brush.

In accordance with another aspect of the present invention, a brush assembly is provided for conducting electrical power from a fixed power system to a rotating ice protection system through a slip ring assembly having a slip ring comprising:

an electrically conductive brush for conducting electrical power to the slip ring;

a wear insert for disposal adjacent said brush; and, a housing having a brush enclosure with an apertures for slidably receiving said brush in alignment with the slip ring and receiving said wear insert, wherein said wear insert minimizes the wear of said brush.

DETAILED DESCRIPTION

Figure 1:
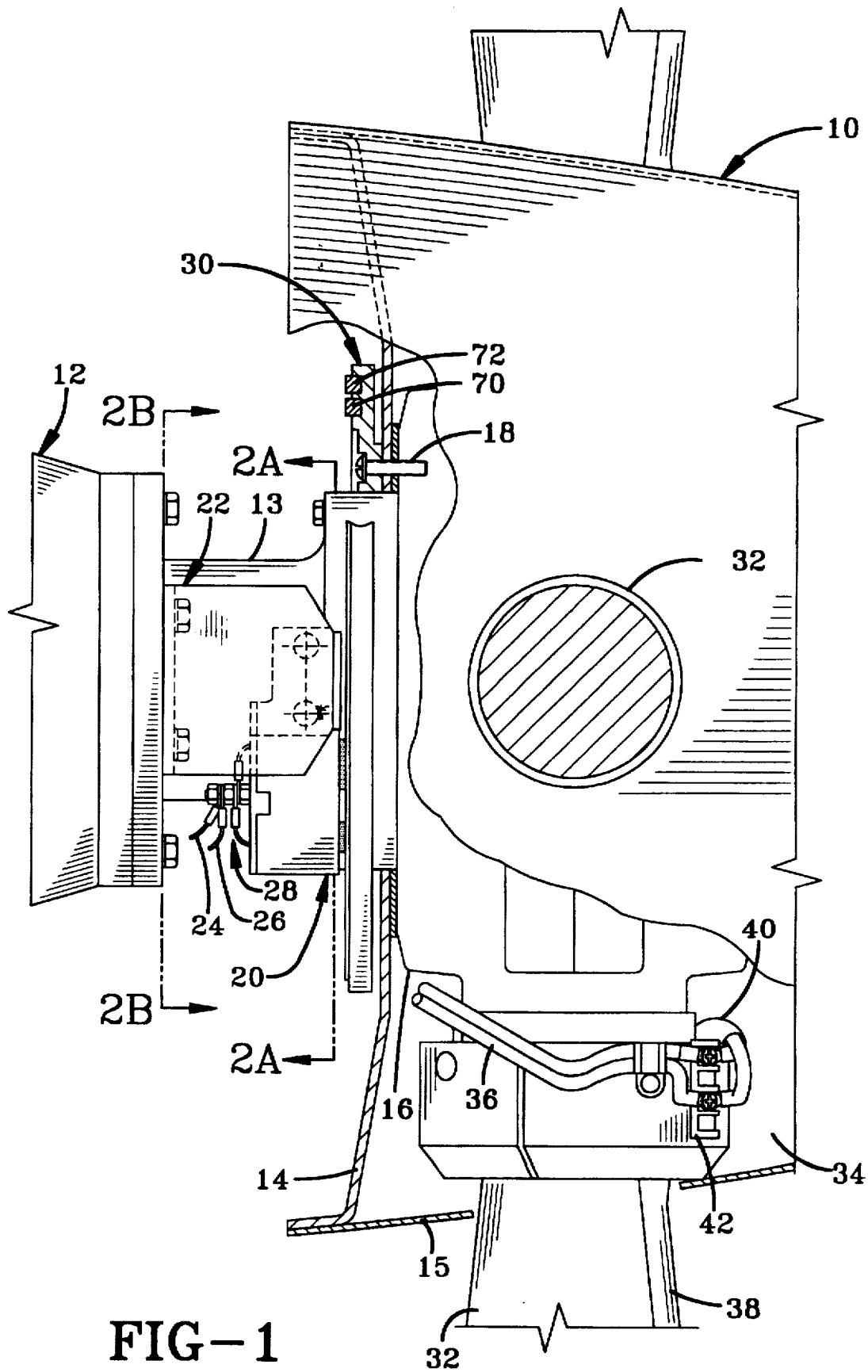
FIG. 1 presents a schematic general arrangement view of an electrothermal propeller de-icing system having a brush assembly according to the invention.

Referring to FIG. 1, a propeller assembly 10 is shown attached to an aircraft engine 12. A brush assembly 20 according to the invention is shown attached to a mounting bracket 22 at the front of the engine 12. Electrical leads 24 and 26 from the ice protection system power supply (not shown) are attached to an electrical power connection 28 attached to the brush assembly 20. A slip ring assembly 30 faces the brush assembly 20. The manner in which power is conducted from the electrical power connection 28 through brush assembly 20 to slip ring assembly 30 will be explained more fully herein.

Still referring to FIG. 1, the slip ring assembly 30 is attached to a spinner bulkhead 14 and a propeller hub 16 by several mounting screws 18. The propeller assembly 10 is attached to the engine 12 by several bolts (not shown) that attach engine drive shaft 13 to propeller hub 16. A spinner dome 15 attaches to bulkhead 14 and serves as a streamlined cover for the hub 16 and other components within the dome. A plurality of propeller blades 32 are mounted to the propeller hub 16. An electrothermal propeller de-icer 38 is shown attached to the leading edge of the propeller blade 32 as is well known in the art. A counterweight 34 is attached to the propeller blade 32. A wire harness 36 is shown attached to the counterweight 34. De-icer leads 40 wrap around beneath the counterweight and attach to terminal strip 42. The wire harness 36 also attaches to terminal strip 42 and serves to transfer electrical power from slip ring 30 to the de-icer leads 40. The other end of the wire harness (not shown) is attached to the back of the bulkhead 14 and connects to power leads (not shown) from the slip ring assembly 30. Such arrangements for transferring power from a slip ring assembly to a propeller de-icer 38 are well known in the art.

Figure 2A:
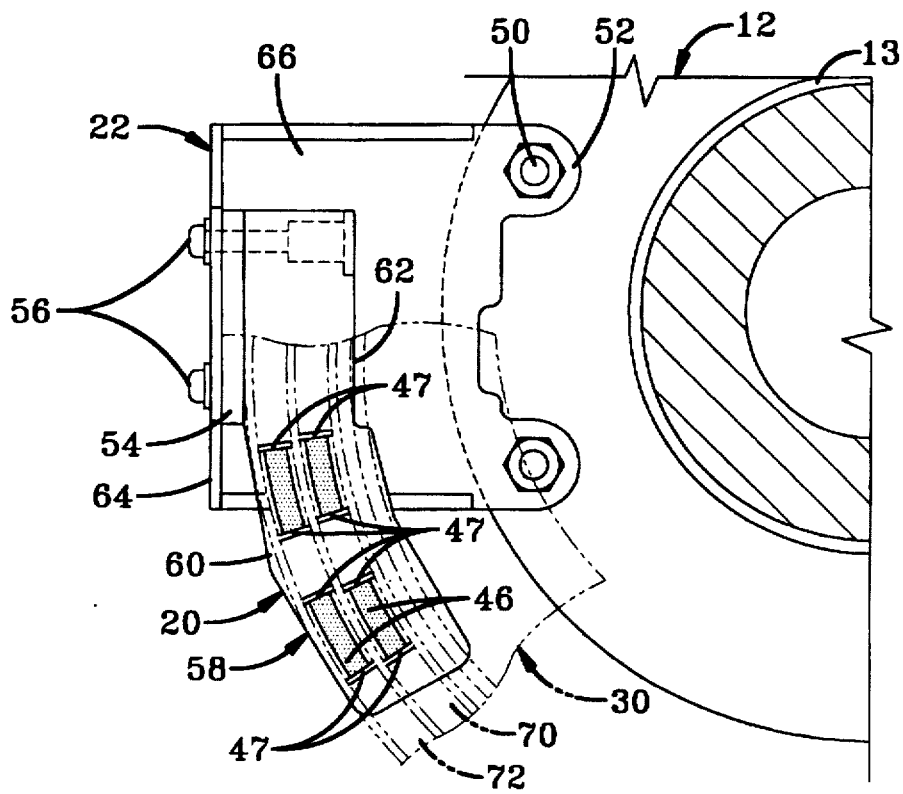
FIG. 2A presents a detailed view of the brush assembly mounting arrangement according to the invention as seen facing the front of the engine along line 2A—2A of FIG. 1.

Referring now to FIG. 2A, mounting bracket 22 is attached to the front of engine 12 at two locations. Mounting bracket 22 has a bracket cantilever 64 that extends from a bracket flange 66. The engine cover plate studs 50 and cover plate nuts 52 are conveniently used to mount the mounting bracket flange 66 to the engine in two locations. Brush assembly 20 includes a housing 58 that comprises a brush enclosure 60 and an attachment leg 62 that extends from brush enclosure 60. Attachment leg 62 is adapted to attach the mounting bracket 22 with the brush enclosure spaced to one side of the bracket 22. More specifically, the brush enclosure should be spaced to one side of the bracket flange 66. Thus, the brush housing 58 is shifted in the plane of rotation of the slip ring 30 away from the mounting bracket 22. Mounting screws 56 pass through the bracket cantilever 64 and engage attachment leg 62. This is known as an "inside" mounting arrangement because the brush assembly 20 is mounted between the bracket cantilever 64 and the engine drive shaft 13. A spacer 54 is located between mounting bracket 22 and attachment leg 62 in order to radially align brushes 46 with slip rings 70 and 72 (shown in phantom).

A plurality of electrically conductive brushes 46 for conducting electrical power to the slip rings are slidably received within a plurality of apertures or slots in the brush enclosure 60. The brushes are shown as having a rectangular cross-section, but other cross-sectional shapes could work equally well in the practice of the invention, such as round or polygonal. The brushes must be in alignment with the slip rings.

A plurality of wear inserts 47 are also received within the brush enclosure apertures. Wear inserts 47 are disposed adjacent the brushes within the apertures.

Biasing means are provided for urging each brush against a slip ring. Thus, brushes 46 and slip rings 70 and 72 form a plurality of sliding contacts. Electrical power is conducted from the brushes 46 of fixed brush assembly 20 through the plurality of sliding contacts to the rotating slip rings 70 and 72 of slip ring assembly 30.

Figure 2B:
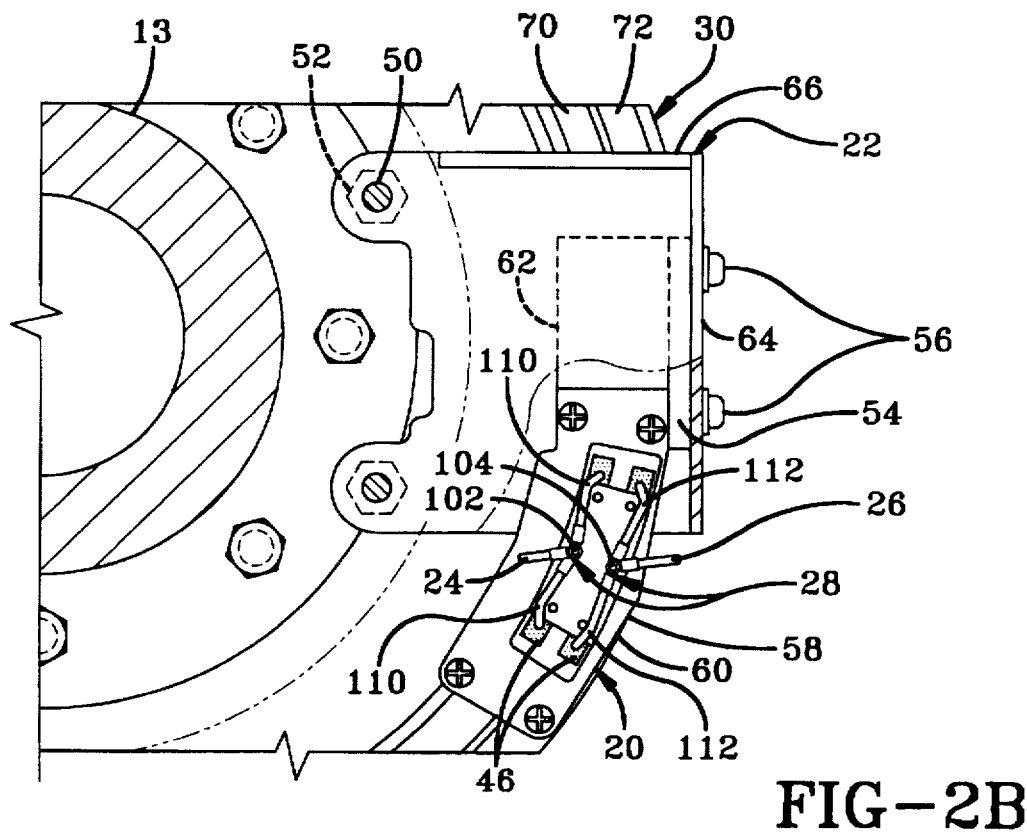
FIG. 2B presents a detailed view of the brush assembly mounting arrangement according to the invention from the back of the mounting bracket as seen facing the propeller assembly along line 2B—2B of FIG. 1.

Referring now to FIG. 2B, brushes 46 are shown riding on slip rings 70 and 72. The slip rings 70 and 72 are mounted within slip ring assembly 30, as will be explained more fully with respect to FIGS. 3A and 3B. Still referring to FIG. 2B, a power connection means 28 for electrically connecting the brush assembly to the power supply system is attached to the back of housing 58 where leads 24 and 26 are connected. The power connection means includes two electrical connectors which, here, are two conductive studs 102 and 104. Electrical power is transferred from the power connection means 28 to the brushes 46 by jumper means which, here, are flexible shunts 110 and 112. Note that there is at least one flexible shunt per brush that electrically connects each brush that aligns with a single slip ring to the electrical connector 102 and 104 corresponding to that slip ring. Electrical power is conducted from the brushes 46 of fixed brush assembly 20 to the rotating slip rings 70 and 72 of slip ring assembly 30 through a sliding contact formed between each brush and slip ring. Slip rings 70 and 72 are preferably formed from a copper alloy, as is well known in the art. Suitable brush compounds are available from National Electrical Carbon Corporation, Greenville, S.C., U.S.A.

Referring again to FIG. 2A, a principal advantage of the invention is that wear inserts 47 reduce the wear of the brushes 46 and enclosure 60. The wear inserts provided on each end of the brush slot provide a smooth, non-abrasive antichafing surface for the brush to ride against. The inserts therefore prevent brush side wear "hooking" and prevent wear to the composite brush enclosure slots. The inserts are replaceable so that if they do wear, they can be rotated 180 degrees to use the opposite side for wear or they can be replaced at minimal cost.

Brush assembly 20 of FIG. 2A has four brushes, the plurality of apertures receiving two brushes 46 in alignment with one with slip ring 70 and two brushes in alignment with another slip ring 72. Utilizing multiple brushes per ring is advantageous in a high current system. Total current draw carried by a single brush that exceeds about 25–30 amps is generally considered to be a high current system. Multiple brushes split the current draw and reduce the current draw carried by the individual brushes. The maximum recommended current density per brush is a function of the brush compound and operating conditions. In lower current systems, a single brush per ring may be desirable. Any such variation is considered to be within the purview of the invention.

Figure 3:
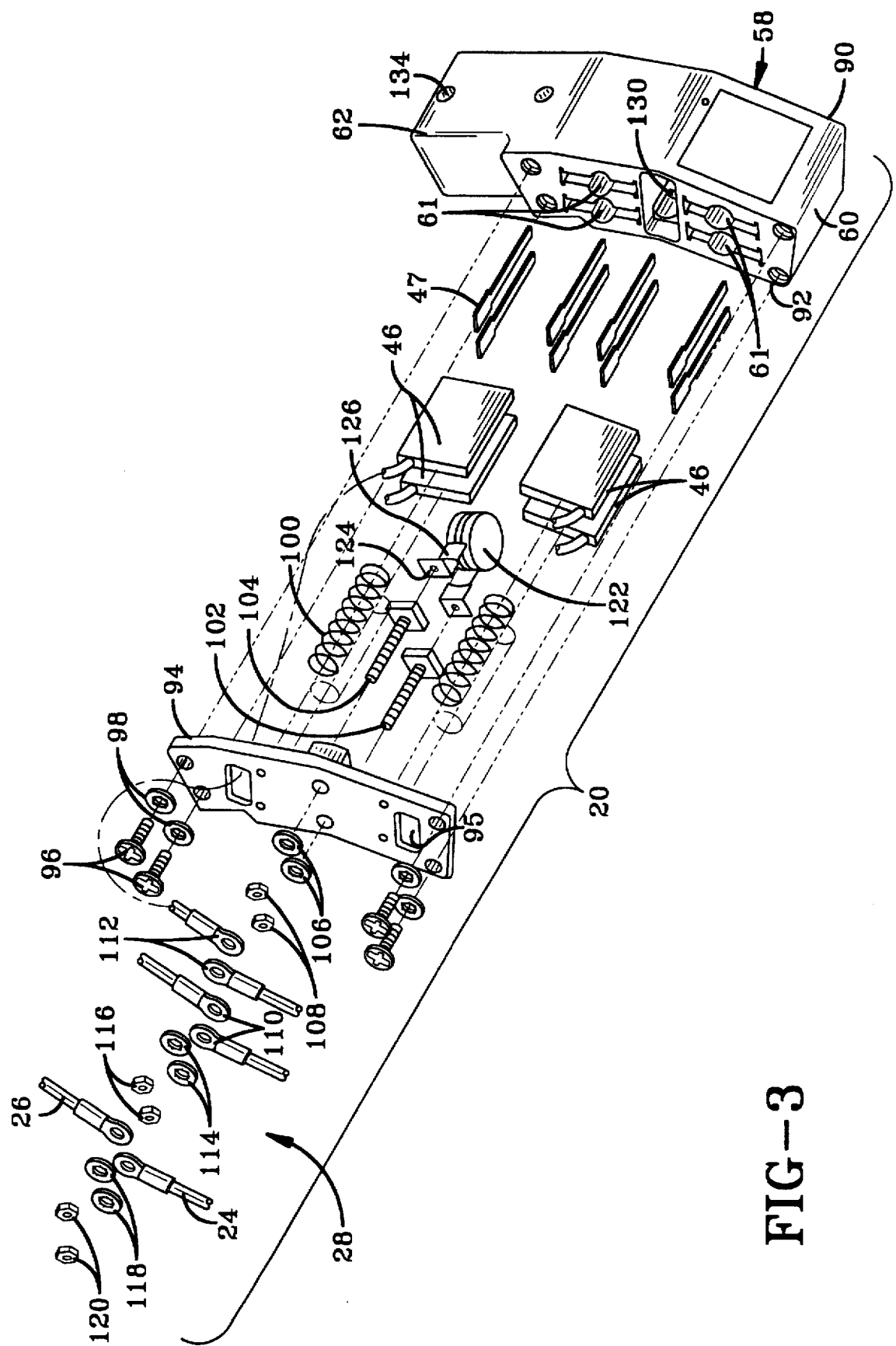
FIG. 3 presents an exploded isometric view of a brush assembly according to the invention.

Referring to FIG. 3, a detailed exploded view of brush assembly 20 is presented. Brush assembly housing 58 comprises brush enclosure 60 and attachment leg 62. Brush enclosure 60 and attachment leg 62 are preferably formed as an integral unit, and may be molded to shape in one piece from an appropriate fiber reinforced plastic molding compound. They can also be machined to shape in one piece from a solid molded block of fiber reinforced plastic material. In either case, a chopped fiberglass reinforced polyester molding compound is preferred such as catalogue number EB7000 available from Cuyahoga Molded Plastics Corporation, Cleveland, Ohio, U.S.A., or catalogue number Haysite 270FR available from Haysite Reinforced Plastics, Erie, Pa. U.S.A. Other molding compounds having equivalent properties are equally suitable, including fiber reinforced epoxies, and are considered to be within the purview of the invention. Brush enclosure 60 and attachment leg 62 could also be formed in separate pieces and subsequently fabricated together, which is also considered to be within the purview of the invention.

Brush enclosure 60 is formed with a plurality of apertures 61 that slidably receive a plurality of brushes 46 and wear inserts 47. Brush enclosure 60 has a first surface 90 that faces the slip ring assembly (not shown) and an opposing second surface 92 spaced from the first surface 90. In a preferred embodiment, a lid 94 is removably affixed to the second surface 92 at four locations with lid screws 96 and lock washers 98. In this embodiment, the housing 58 comprises the brush enclosure 60, the attachment leg 62, and the lid 94. The lid 94 may be formed by machining a fiber reinforced plastic plate, but is preferably molded to shape using the same molding compounds previously described in relation to brush enclosure 60 and attachment leg 62. If lid 94 is machined from a plate, a preferable material is an epoxy fiberglass plate according to NEMA (National Electrical Manufacturers Association) grade G-10.

Biasing means must be provided to bias the brushes 46 against the slip rings (not shown). Here, such biasing means includes a plurality of helical springs 100 disposed in compression between the lid 94 and the brushes 46. At least one spring 100 must be provided for each brush 46. The springs 100 are received within the apertures in the brush enclosure. Other types of springs may be equally suitable in the practice of the invention. Performance of brush assembly 20 may be further enhanced by selecting springs designed to certain parameters.

Referring still to FIG. 3, power connection means 28 is attached to the top of lid 94. Here, the power connection means comprises two electrical connectors or studs 102 and 104 that are threaded into and fixed to the lid 94. Lock washers 106 and nuts 108 lock the studs 102 and 104 in place. At least one electrical connector must correspond to each slip ring. Variations are possible without departing from the scope of the invention. For example, more than one stud per slip ring could be provided, in which case a group of studs corresponding to a single slip ring would constitute a single electrical connector. Likewise, a male or female shell-type connector having a plurality of connectors could be attached to the lid 94.

Regardless of the type of power connection means 28 utilized, some type of jumper means for transferring electrical power from the power connection means 28 to the plurality of brushes 46 is required. Here, such jumper means comprise flexible shunts 110 and 112. Flexible shunts 110 and 112 are formed from an insulated multiple stranded wire. One end of each shunt is preferably integrally formed into the corresponding brush 46. The other end of the shunt passes through an aperture 95 in lid 94 and is preferably terminated in a ring terminal that is clamped to one of studs 102 and 104 using lock washers 114 and nuts 116. Note that at least one flexible shunt 110 or 112 per brush is provided that electrically connects each brush aligned with a single slip ring to the electrical connection 102 or 104 corresponding to that slip ring. For example, two of brushes 46 that align with a single slip ring (see FIG. 2A) are connected to a first electrical connector 102 via flexible shunts 110. The two brushes that align with the other slip ring (see FIG. 2A) are connected to a second electrical connector 104 via flexible shunts 112. Other shunt and terminal arrangements are possible without departing from the scope of the invention. Lock washers 118 and nuts 120 are provided for attaching system power or ground leads 24 and 26, as required, to electrical connectors 102 and 104, as depicted in FIGS. 1 and 2B.

A transient voltage suppressor means 122 is connected across first and second electrical connectors 102 and 104, and is disposed within the housing. Here, the electrical connectors 102 and 104 are studs and the transient voltage suppressor means comprises a pair of metal oxide varistors (MOV) that are soldered together, disposed in connectors 124, 126 and secured by studs 102 and 104. Thus, the transient voltage suppressor 122 is connected across the electrical connectors 102 and 104. Studs 102 and 104 are preferably formed from a stainless steel alloy with a 6-32 UNC-2A external thread. A suitable metal oxide varistor is catalogue number V150ZA8 available from Harris Semiconductor, Melbourne, Fla., United States of America, having properties as described in a catalogue entitled "Transient Voltage Suppression Devices Fifth Edition," catalogue number 400.3, dated September, 1989, available from that company. At least two of these varistors are preferably connected in parallel as shown. The MOV manufacturer should be consulted when determining MOV characteristics for a particular application. Lightning testing may also be required.

The transient voltage suppressor means 122 functions as an open switch during normal system operation and as a closed switch when a high electrical potential induced by a lightning strike appears across electrical connectors 102 and 104. A first electrical connector 102 must be a ground connector that connects to system ground. A second electrical connector 104 must be a power connector that connects to the power supply system. This permits the transient voltage suppressor 122 to shunt the power connector to the ground connector when a lightning strike occurs. The roles of the electrical connectors 102 and 104 can be reversed without effecting transient voltage suppressor performance as long as one of the electrical connectors is connected to power system ground. This arrangement prevents feedback of high potential induced by lightning strike into the power system by shunting the high potential to ground. The transient voltage suppressor means can include several MOV's if there are more than one power connectors, with an MOV for each power connector.

Directly connecting the transient voltage suppressor 122 to the electrical connectors 102 and 104 within housing 58 greatly reduces the electrical impedance in the shunt circuit. Reducing the electrical impedance in the shunt circuit increases the effectiveness of the transient voltage suppressor 122. This is an advantage over previous arrangements where the transient voltage suppressor was mounted externally and was attached to electrical connectors 102 and 104 by relatively long wires. A cavity 130 is provided within housing 58 for receiving the transient voltage suppressor 122.

Figure 4A:
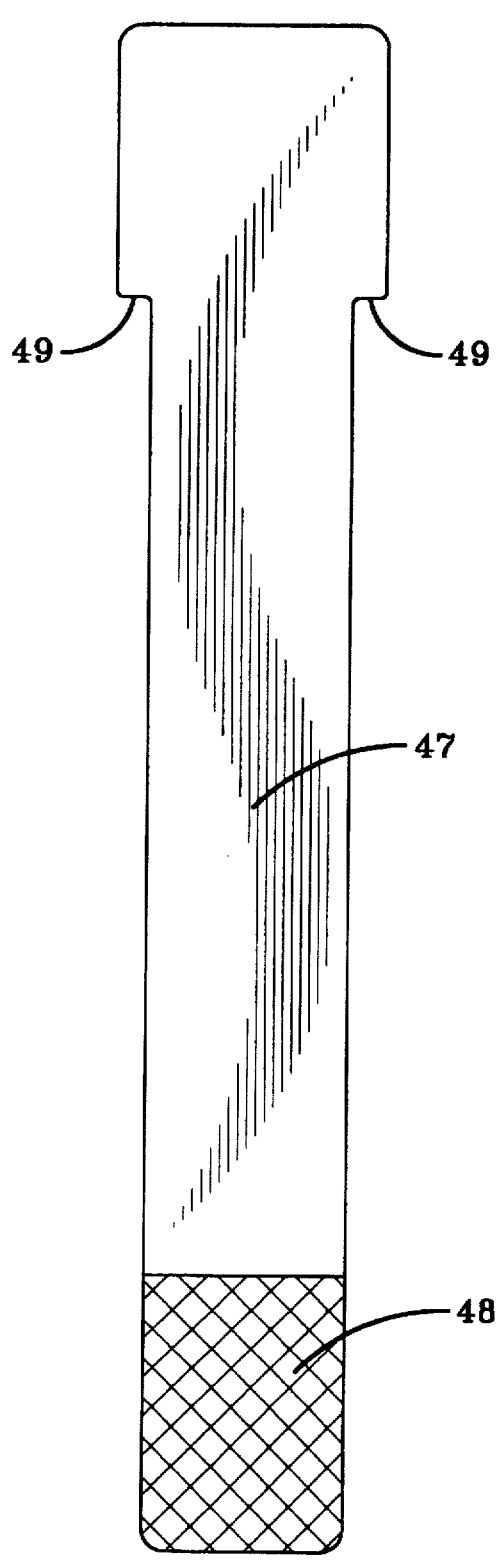
FIG. 4a is a front view of a wear insert in accordance with the present invention.
Figure 4B:
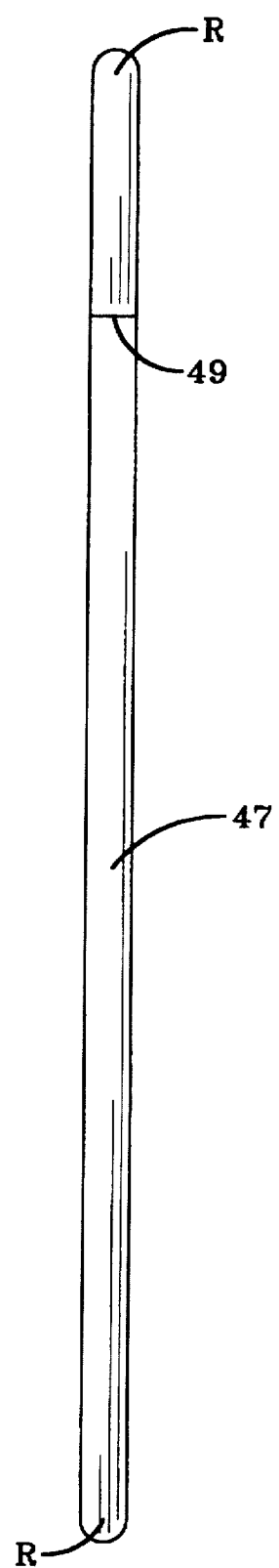
FIG. 4b is a side view of a wear insert in accordance with the present invention.

Referring now to FIGS. 4a and 4b, wherein a wear insert 47 in accordance with the present invention is configured so as to have a pair of tabs or shoulders 49. The inserts may be made from thin sheet material which can be easily stamped out. The preferred material is 0.040 inch thick phosphor bronze alloy CDA51000 with spring temper. Other nonabrasive, wear resistant materials, such as metals, ceramics and plastics may be utilized. Since the enclosure 60 is typically made from a composite matrix and typically abrasive, the wear inserts should be made of a material which is less abrasive and more wear resistant material than that of the enclosure 60. Flatness of the stamped inserts is not critical, since the insert slots will hold the flexible insert to a flat position once the insert is installed into the enclosure. The finish of the area above shaded area 48 is preferably on the order of 32 micro inches or better. Other attachment methods might require the insert to be made flat so as not to bind the brush. However, the shaded area 48 should have on the order of a 16 micro inch finish or better on both sides and on the radius R. The radius R should be on the order of 0.02 to 0.03 inches for the material thickness specified above.

It is to be noted that the radius R on the bottom of the insert 47 prevents chafing of the brush. It has been found that inserts less than 0.020 inches thick cannot be radiused effectively because the insert acts like a knife edge and cuts into the brush. For thinner insert thicknesses, it is possible to bend the insert rather than machine a radius on the bottom in order to prevent brush chafing.

Figure 5:
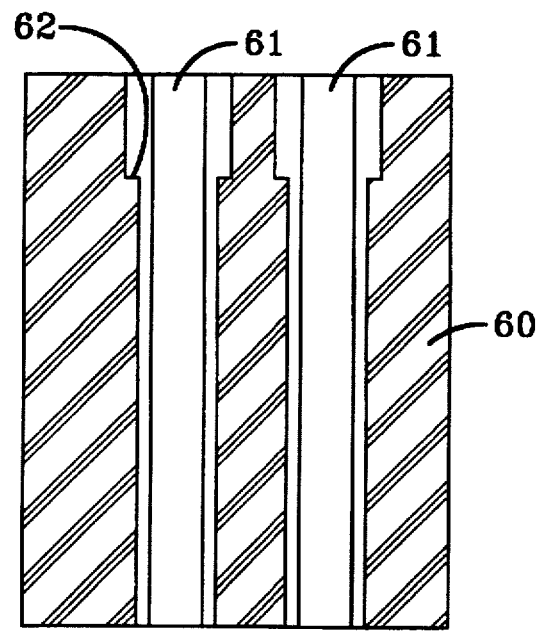
FIG. 5 is a cross-sectional view of a brush block housing in accordance with the present invention.

Referring now to FIG. 5, wherein a enclosure 60 for receiving the brushes 46 and wear inserts 47 of FIG. 3 includes an aperture 61 having mating steps or shoulders 63 for mating with the shoulders 49 of wear inserts 47 and supporting the inserts. The inserts 47 and enclosure 60 are configured so that the inserts slide easily into the aperture and are held vertically in place so as not to interfere with the slip ring.

Figure 6:
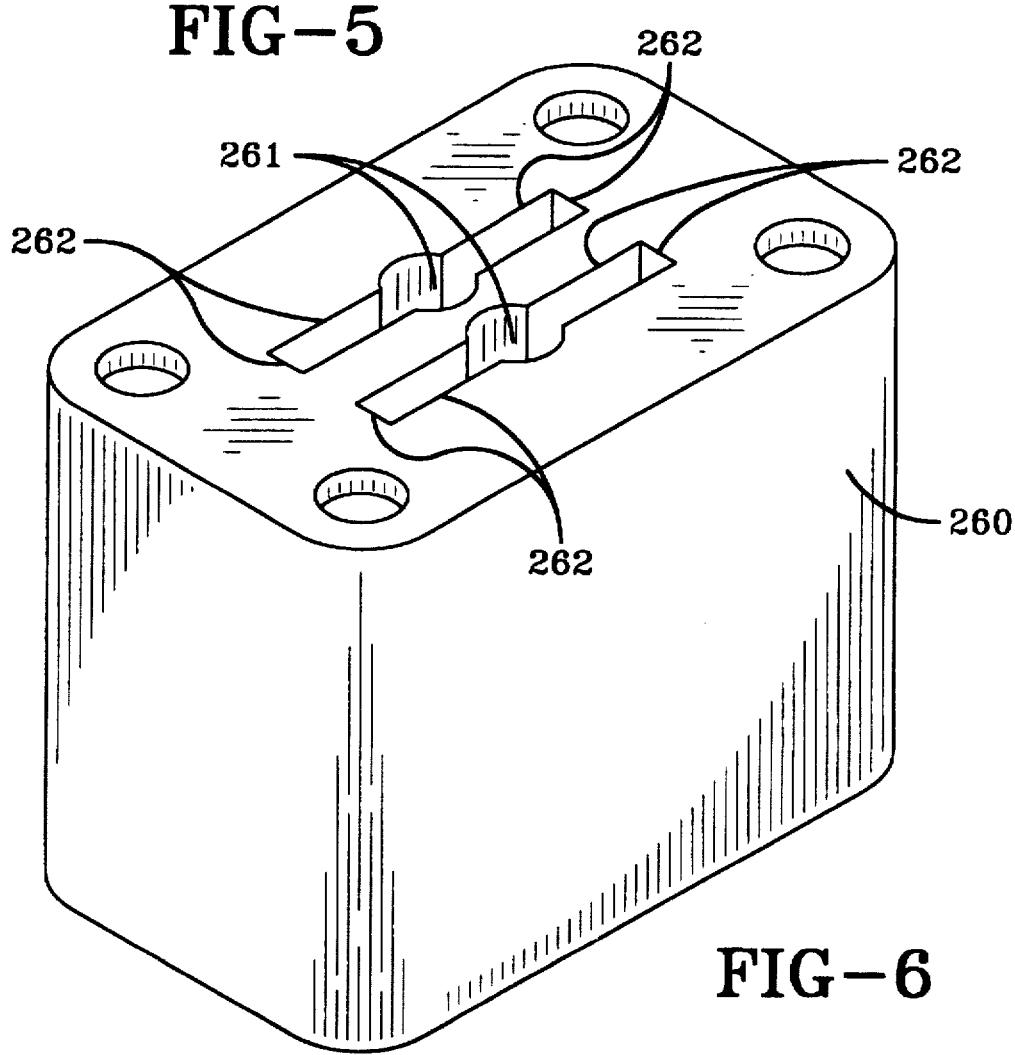
FIG. 6 is an isometric view of an alternative embodiment of a brush block housing in accordance with the present invention.

Referring now to FIG. 6 wherein an alternative brush enclosure 260 is provided. Enclosure 260 has two apertures 261 for receiving a pair of brushes (not shown). Enclosure 260 is preferably molded to shape in one piece from an appropriate fiber reinforced plastic molding compound such as described hereinbefore. At least on surface 262 of the apertures 261, however, is comprised of a nonabrasive, wear resistant material, such as metals, plastics or ceramics. The preferred material is a phosphor bronze alloy. If the enclosure 260 material is abrasive, surface 262 should be comprised of a material less abrasive than the enclosure 260. Surface 262 may be provided by molding, depositing, pressing or bonding a nonabrasive material to the inside of aperatures 261. The bottom of the wearing surface should be free from sharp edges by, for instance, radiusing the edge. Alternatively, wear inserts as described hereinbefore may be utilized. The present invention is intended to provide a nonabrasive material for the brushes to ride against to thereby minimize and reduce the amount of wear on both the brushes and enclosure. Minimization of the wear thereof helps to prevent contamination from building up on the inside of the apertures which heretofore would cause sticking of the brushes within the apertures.

A 600 hour lab test was performed to compare the present four brush block assembly with prior ones. The test was performed with a slip ring assembly that was intentionally machined 0.040 inches out of flatness in order to cause the brushes to cycle in and out of the brush housing as observed in poorly maintained field installations. The slip ring was saturated with turbine oil daily in order to build up sludge. The slip ring was run at 1750 RPM. Electrical power (28 VDC, 35 amps) was alternated between the two brush assemblies to provide equal power exposure. The brush blocks were cleaned at 300 hours and 600 hours.

The results are as follows:

|  | Old Assembly | New Assembly |
| --- | --- | --- |
| Brush Sidewear | 0.078" | 0.007" |
| Brush Slot Wear | 0.015" | No Wear |

It is to be noted that the brush block assemblies shown and described herein are for exemplary purposes only, and that other configurations may be utilized. A further description of brush block assemblies is found in commonly owned U.S. Patent No. 5,479,060, the disclosure of which is fully incorporated herein by reference.

Figure 7:
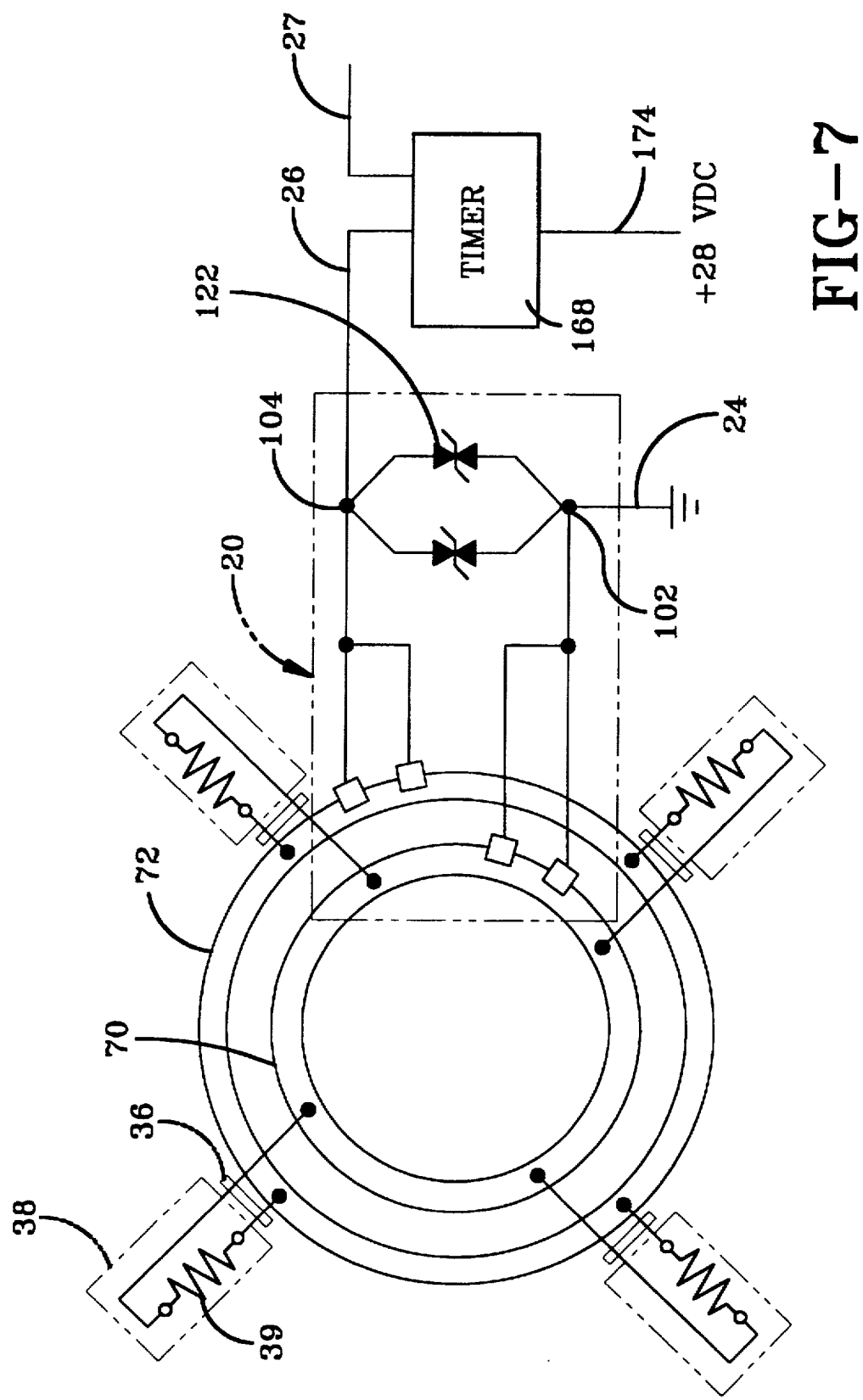
FIG. 7 presents an electrical schematic of an electrothermal propeller de-icing system utilizing the invention.

Referring now to FIG. 7, wherein an electrical schematic of a representative propeller ice protection system is presented. Only one propeller ice protection system corresponding to one engine is shown, the system corresponding to the other engine being a mirror image. The power supply system comprises a timer 168 electrically connected to an aircraft power bus via power line 174 which in this example supplies 28 VDC to the timer. A circuit breaker (not shown) and an ammeter (not shown) for monitoring system current may also be provided in series with the power line 174. The timer 168 switches electrical power from power line 174 to the individual leads 26 and 27, which are routed to each brush assembly. The timer 168 switches power to leads 26 and 27 in a predetermined timed sequence. Ring 72 is connected to electrical leads 26 through brush assembly 20. Ring 70 is connected to ground lead 24 through brush assembly 20. Ground lead 24 may also be routed through the timer. Power is transferred to resistive heaters 39 within de-icers 38 through flexible wire harnesses 36. Transient voltage suppressor 122, here an MOV, is shown connected across power lead 26 and ground lead 24 where the leads are connected to the brush assembly 20. With this arrangement, the transient voltage suppressor 122 may shunt any high potential in lead 26 induced by lightning strike to ground lead 24 as previously described. Though shown transferring power to resistive heaters, the invention would be useful in transferring power to any electrical load mounted on an aircraft propeller.

It is evident that many variations are possible without departing from the true scope and spirit of the invention as defined by the claims that follow.

We claim:

1. An apparatus for conducting electrical power from a fixed power system to a rotating ice protection system through a slip ring assembly having a slip ring comprising:

an electrically conductive brush for conducting electrical power to the slip ring;

a housing having a brush enclosure with an aperture for slidably receiving said brush in alignment with the slip ring, wherein at least a portion of the surface of said aperture in contact with said brush is non-abrasive for minimizing the wear rate of said brush.

wherein said non-abrasive portion of said surface is comprised of ceramic.

2. An apparatus for conducting electrical power from a fixed power system to a rotating ice protection system through a slip ring assembly having a slip ring comprising:
- an electrically conductive brush for conducting electrical power to the slip ring;
- a housing having a brush enclosure with an aperture for slidably receiving said brush in alignment with the slip ring, wherein at least a portion of the surface of said aperture in contact with said brush is non-abrasive for minimizing the wear rate of said brush,
- wherein said non-abrasive portion of said surface is comprised of a phosphor bronze alloy.

3. An apparatus for conducting electrical power from a fixed power system to a rotating ice protection system through a slip ring assembly having a slip ring comprising:
- an electrically conductive brush for conducting electrical power to the slip ring;
- a housing having a brush enclosure with an aperture for slidably receiving said brush in alignment with the slip ring wherein at least a portion of the surface of said aperture in contact with said brush is non-abrasive for minimizing the wear rate of said brush, and said non-abrasive portion provides a non-abrasive surface for movement of said brush to and from the slip ring.

4. An apparatus in accordance with claim 1, wherein said non-abrasive portion of said surface is comprised of metal.

5. An apparatus in accordance with claim 1, wherein said non-abrasive portion of said surface is comprised of plastic.

6. An apparatus in accordance with claim 3, wherein said housing is comprised of composite matrix and said non-abrasive portion of said surface is comprised of metal.

7. An apparatus in accordance with claim 3, wherein said housing is comprised of a first material and said non-abrasive portion of said surface is comprised of a second material less abrasive than said first material.

8. An apparatus in accordance with claim 3, wherein said non-abrasive portion of said surface is comprised of ceramic.

9. An apparatus in accordance with claim 3, wherein said non-abrasive portion of said surface is comprised of a phosphor bronze alloy.

10. An apparatus for conducting electrical power from a fixed power system to a rotating ice protection system through a slip ring assembly having a slip ring comprising:
- an electrically conductive brush for conducting electrical power to the slip ring;
- a wear insert disposed adjacent said brush; and,
- a housing having a brush enclosure with an aperture for slidably receiving said brush in alignment with the slip ring and for receiving said wear insert,
- wherein said wear insert minimizes the wear of said brush, and said wear insert provides a non-abrasive surface for movement of said brush to and from the slip ring.

11. An apparatus in accordance with claim 10, wherein said wear insert is comprised of metal.

12. An apparatus in accordance with claim 10, wherein said wear insert is comprised of plastic.

13. An apparatus in accordance with claim 10, wherein said wear insert is comprised of ceramic.

14. An apparatus in accordance with claim 10, wherein said wear insert is comprised of a phosphor bronze alloy.

15. An apparatus in accordance with claim 10, wherein said housing is comprised of composite matrix and said wear insert is comprised of metal.

16. An apparatus in accordance with claim 10, wherein said housing is comprised of a first material and said wear insert is comprised of a second material less abrasive than said first material.

17. An apparatus for conducting electrical power from a fixed power system to a rotating ice protection system through a slip ring assembly having a plurality of slip rings comprising:
- a plurality of electrically conductive brushes for conducting electrical power to the slip rings with at least one brush per slip ring;
- a plurality of wear inserts disposed adjacent said plurality of brushes; and,
- a housing having a brush enclosure with a plurality of apertures for slidably receiving said plurality of brushes in alignment with the slip rings and for receiving said wear inserts,
- wherein said wear inserts minimize the wear of said plurality of brushes, and said wear inserts provide a non-abrasive surface for movement of said brush to and from the slip ring.

18. An apparatus in accordance with claim 17, wherein said wear inserts are comprised of metal.

19. An apparatus in accordance with claim 17, wherein said wear inserts are comprised of plastic.

20. An apparatus in accordance with claim 17, wherein said wear inserts are comprised of ceramic.

21. An apparatus in accordance with claim 17, wherein said wear inserts are comprised of a phosphor bronze alloy.

22. An apparatus in accordance with claim 17, wherein said housing is comprised of composite matrix and said wear inserts are comprised of metal.

23. An apparatus in accordance with claim 17, wherein said housing is comprised of a first material and said wear inserts are comprised of a second material less abrasive than said first material.

24. An apparatus for conducting electrical power from a fixed power system to a rotating ice protection system through a slip ring assembly having a slip ring comprising:
- a plurality of electrically conductive brushes for conducting electrical power to the slip ring;
- a housing having a brush enclosure with a plurality of apertures for slidably receiving said brushes in alignment with the slip ring, wherein at least a portion of the surface of said apertures in contact with said brushes is non-abrasive for minimizing the wear rate of said brushes, and said non-abrasive portion provides a non-abrasive surface for movement of said brush to and from the slip ring.

25. An apparatus for conducting electrical power from a fixed power system to a rotating ice protection system through a slip ring assembly having a slip ring comprising:
- an electrically conductive brush for conducting electrical power to the slip ring;
- a housing having a brush enclosure with an aperture for slidably receiving said brush in alignment with the slip ring, wherein at least a portion of the surface of said aperture in contact with said brush is non-abrasive for minimizing the wear rate of said brush and housing, and said non-abrasive portion provides a non-abrasive surface for movement of said brush to and from the slip ring.

26. An apparatus for use in a system for conducting electrical power from a fixed power system to a rotating ice protection system through a slip ring assembly having a slip ring, the system having an electrically conductive brush for conducting electrical power to the slip ring and a housing having a brush enclosure with an aperture for slidably receiving the brush in alignment with the slip ring, the apparatus comprising:

an insert having a positioning means for keeping said insert positioned in the brush enclosure, said insert being comprised of a non-abrasive material for minimizing the wear rate of the brush, and said insert provides a non-abrasive surface for movement of said brush to and from the slip ring.

27. An apparatus in accordance with claim 26, wherein said wear insert is comprised of metal.

28. An apparatus in accordance with claim 26, wherein said wear insert is comprised of plastic.

29. An apparatus in accordance with claim 26, wherein said wear insert is comprised of ceramic.

30. An apparatus for use in a system for conducting electrical power from a fixed power system to a rotating ice protection system through a slip ring assembly having a slip ring, the system having an electrically conductive brush for conducting electrical power to the slip ring, said apparatus comprising:

a housing having a brush enclosure with an aperture for slidably receiving the brush in alignment with the slip ring, wherein at least a portion of the surface of the aperture in contact with the brush is non-abrasive for minimizing the wear rate of the brush, and said non-abrasive portion provides a non-abrasive surface for movement of said brush to and from the slip ring.

31. An apparatus in accordance with claim 30, wherein said non-abrasive portion of said surface is comprised of metal.

32. An apparatus in accordance with claim 30, wherein said non-abrasive portion of said surface is comprised of plastic.

33. An apparatus in accordance with claim 30, wherein said non-abrasive portion of said surface is comprised of ceramic.

* * * * *